(12) United States Patent
Hao et al.

(10) Patent No.: US 11,835,749 B2
(45) Date of Patent: Dec. 5, 2023

(54) BACKLIGHT AND DISPLAY DEVICE

(71) Applicants: ORDOS YUANSHENG OPTOELECTRONICS CO., LTD., Inner Mongolia (CN); BOE TECHNOLOGY GROUP CO., LTD., Beijing (CN)

(72) Inventors: Ruijun Hao, Beijing (CN); Long Lian, Beijing (CN); Tianlei Shi, Beijing (CN); Wulijibaier Tang, Beijing (CN); Yuefeng Li, Beijing (CN); Zhongping Zhao, Beijing (CN); Xiaojie Wang, Beijing (CN); Wei Ning, Beijing (CN); Feixiang Guo, Beijing (CN); Xuefeng Zhang, Beijing (CN); Haifang Hu, Beijing (CN); Yongkai Wu, Beijing (CN); Le Sun, Beijing (CN)

(73) Assignees: Ordos Yuansheng Optoelectronics Co., Ltd., Inner Mongolia (CN); BOE TECHNOLOGY GROUP CO., LTD., Beijing (CN)

(*) Notice: Subject to any disclaimer, the term of this patent is extended or adjusted under 35 U.S.C. 154(b) by 238 days.

(21) Appl. No.: 17/421,966

(22) PCT Filed: Jan. 8, 2021

(86) PCT No.: PCT/CN2021/070757
§ 371 (c)(1),
(2) Date: Jul. 9, 2021

(87) PCT Pub. No.: WO2021/147688
PCT Pub. Date: Jul. 29, 2021

(65) Prior Publication Data
US 2022/0342139 A1    Oct. 27, 2022

(30) Foreign Application Priority Data
Jan. 20, 2020   (CN) .......................... 202010065722.0

(51) Int. Cl.
*F21V 8/00* (2006.01)
*G02F 1/1333* (2006.01)

(52) U.S. Cl.
CPC .......... *G02B 6/0021* (2013.01); *G02B 6/0055* (2013.01); *G02F 1/133314* (2021.01); *G02F 1/133325* (2021.01)

(58) Field of Classification Search
CPC . G02B 6/0021; G02B 6/009; G02F 1/133314; G02F 1/133325
See application file for complete search history.

(56) References Cited

U.S. PATENT DOCUMENTS 7,637,646 B2 * 12/2009 Byun ................... G02B 6/0016
                                                            362/621
8,337,066 B2 * 12/2012 Yeh ....................... G02B 6/0073
                                                            362/97.3
(Continued)

FOREIGN PATENT DOCUMENTS

CN          1371018 A      9/2002
CN          1651994 A      8/2005
(Continued)

OTHER PUBLICATIONS

English Machine Translation of CN 1847942 A (Year: 2006).*
(Continued)

*Primary Examiner* — Keith G. Delahoussaye
(74) *Attorney, Agent, or Firm* — Myers Bigel, P.A.

(57) ABSTRACT

A backlight and a display device are provided herein, which is related to the field of display technology and intends to improve visual effect of the image displayed by the display device. The backlight may include a back plate, a light guide plate and a light source. The back plate includes an accommodation groove, and the light guide plate includes a holding groove at a first side surface of the light guide plate. The light source includes at least one light emitting element.

(Continued)

The holding groove is configured to hold at least a portion of the at least one light emitting element, and the accommodation groove is configured to accommodate the light guide plate and the light source.

19 Claims, 4 Drawing Sheets

(56) References Cited

U.S. PATENT DOCUMENTS

| | | |
|---|---|---|
| 2007/0008739 A1 | 1/2007 | Kim et al. |
| 2007/0047263 A1 | 3/2007 | Cheng |
| 2013/0208504 A1 | 8/2013 | Huang |
| 2016/0103277 A1 | 4/2016 | Wu et al. |
| 2016/0282536 A1* | 9/2016 | Zhang .................. G02B 6/009 |

FOREIGN PATENT DOCUMENTS

| | | |
|---|---|---|
| CN | 1847942 A | 10/2006 |
| CN | 1892361 A | 1/2007 |
| CN | 101281318 A | 10/2008 |
| CN | 102537793 A | 7/2012 |
| CN | 102691929 A | 9/2012 |
| CN | 203082685 U | 7/2013 |
| CN | 203823673 U | 9/2014 |
| CN | 104298002 A | 1/2015 |
| CN | 104456310 A | 3/2015 |
| CN | 205210477 U | 5/2016 |
| CN | 208126071 U | 11/2018 |
| CN | 208834053 U | 5/2019 |
| CN | 111221180 A | 6/2020 |
| KR | 20090095366 A | 9/2009 |

OTHER PUBLICATIONS

English Machine Translation of CN 101281318 A (Year: 2008).*
English Machine Translation of CN 205210477 U (Year: 2016).*
Chinese Decision on Rejection corresponding to CN 202010065722.0; dated Sep. 2, 2021 (14 pages, including English translation).
First Chinese Office Action corresponding to CN 202010065722.0; dated Feb. 9, 2021 (15 pages, including English translation).
International Search Report corresponding to PCT/CN2021/070757; dated Mar. 29, 2021 (7 pages, including English translation).
Second Chinese Office Action corresponding to CN 202010065722.0; Jun. 23, 2021 (17 pages, including English translation).

* cited by examiner

BACKLIGHT AND DISPLAY DEVICE

CROSS-REFERENCE TO RELATED APPLICATIONS

The present application is a 35 U.S.C. 371 national stage application of a PCT International Application No. PCT/CN2021/070757, filed on Jan. 8, 2021, which itself claims the benefit of Chinese Patent Application No. 202010065722.0, filed on Jan. 20, 2020, the entire disclosure of both of which are incorporated herein by reference.

TECHNICAL FIELD

The present disclosure relates to the field of display technologies, specifically to a backlight and a display device.

BACKGROUND

A liquid crystal display device mainly comprises a display panel and a backlight. The backlight generally includes a back plate, a light source, a light guide plate and an optical film, etc. Light emitted from the light source is processed by the light guide plate and the optical film, creating back light for the display panel to display an image. However, there is a great improvement space in the structure of the existing liquid crystal display device and the quality of the displayed image thereof, e.g., a narrower frame, a more uniform brightness of the displayed image are desired for the liquid crystal display device.

SUMMARY

A backlight provided by the embodiments herein comprises: a back plate comprising an accommodation groove; a light guide plate comprising a first side surface and a holding groove at the first side surface; and a light source comprising at least one light emitting element. The holding groove is configured to hold at least a portion of the at least one light emitting element, and the accommodation groove is configured to accommodate the light guide plate and the light source.

According to some embodiments of the disclosure, the back plate comprises a bottom plate and a plurality of side walls, and the plurality of side walls surround the bottom plate to form the accommodation groove with the bottom plate.

According to some embodiments of the disclosure, the light source comprises a circuit board comprising a body, the at least one light emitting element is arranged on a surface of the body facing the holding groove.

According to some embodiments of the disclosure, the circuit board further comprises an extension portion connected to the body, wherein the back plate further comprises an escape opening, the escape opening is configured to allow the extension portion to extend from accommodation groove to outside of the accommodation groove through the escape opening.

According to some embodiments of the disclosure, an extension direction of the extension portion is perpendicular to an extension direction of the body.

According to some embodiments of the disclosure, the plurality of side walls of the back plate comprise a first side wall, the first side wall is directly opposite to the first side surface of the light guide plate and comprises the escape opening.

According to some embodiments of the disclosure, the plurality of side walls of the back plate comprise a detachable side wall, the detachable side wall is configured to be detachably connected to an adjacent side wall thereof and the bottom plate, so that an mounting opening is formed for allowing the light guide plate and the light source to enter or come out of the accommodation groove when the detachable side is detached, wherein the escape opening in the first side wall extends to the mounting opening.

According to some embodiments of the disclosure, the holding groove comprises a first groove and a second groove, the first groove comprises a first opening and a first bottom, the second groove comprises a second opening and a second bottom, wherein the first opening penetrates at least a portion of the first side surface of the light guide plate, the second opening penetrates at least a portion of the first bottom, such that the first groove communicates with the second groove.

According to some embodiments of the disclosure, an orthographic projection of the second opening on the first side surface is within an orthographic projection of the first opening on the first side surface.

According to some embodiments of the disclosure, the at least one light emitting element is arranged in the second groove, the body of the circuit board is arranged in the first groove.

According to some embodiments of the disclosure, the second groove comprises a strip groove configured to accommodate all of the at least one light emitting element.

According to some embodiments of the disclosure, the second groove comprises a plurality of sub-grooves arranged along the first bottom, a number of the plurality of sub-grooves corresponds to a number of the light emitting element of the at least one light emitting element, each of the plurality of sub-grooves is configured to accommodate one of the at least one light emitting element.

According to some embodiments of the disclosure, the light guide plate is located on the bottom plate, the backlight further comprises an optical film arranged on a light exit surface of the light guide plate, the light guide plate further comprises at least one positioning pillar on the light exit surface, the optical film comprises at least one mating notch, each of the at least one positioning pillar is configured to be capable of being assembled in a corresponding mating notch of the at least one mating notch so that the optical film is fixed to the light exit surface.

According to some embodiments of the disclosure, the light exit surface of the light guide plate comprises a first edge connected to the first side surface, the at least one positioning pillar is arranged on the light exit surface along the first edge.

According to some embodiments of the disclosure, the at least one positioning pillar comprises a prism, a shape of the mating notch fits with the prism.

According to some embodiments of the disclosure, a mating gap exists between each positioning pillar of the at least one positioning pillar and a corresponding mating notch of the optical film, the at least one positioning pillar comprises a primary positioning pillar in the middle of the first edge and a secondary positioning pillar on at least one side of the primary positioning pillar, the mating gap between the secondary positioning pillar and a corresponding mating notch is greater than the mating gap between the primary positioning pillar and a corresponding mating notch.

According to some embodiments of the disclosure, the back plate further comprises a bending side wall and a positioning side wall, the bending side wall extends from the first side wall towards the accommodation groove, the positioning side wall extends towards the bottom plate from an end of the bending side wall away from the first side wall.

According to some embodiments of the disclosure, an orthogonal projection of the at least one positioning pillar on the bottom plate is within an orthogonal projection of the bending side wall on the bottom plate.

According to some embodiments of the disclosure, the backlight further comprises a reflection sheet between the light guide plate and the bottom plate, a material of the light guide plate fills a space enclosed by the reflection sheet, the first side wall, the bending side wall and the position side wall, wherein the optical film is between the positioning side wall and the light exit surface of the light guide plate.

Another embodiment of the disclosure provides a display device comprising the backlight according to any one of the above embodiments.

An overview of the technical solution of the embodiments has been described. In order to more clearly understand technical solutions of the embodiments herein and implement them based on the description, the embodiments will be elaborated in detail below with reference to the drawings by way of examples.

DETAILED DESCRIPTION OF EMBODIMENTS

Figure 1:
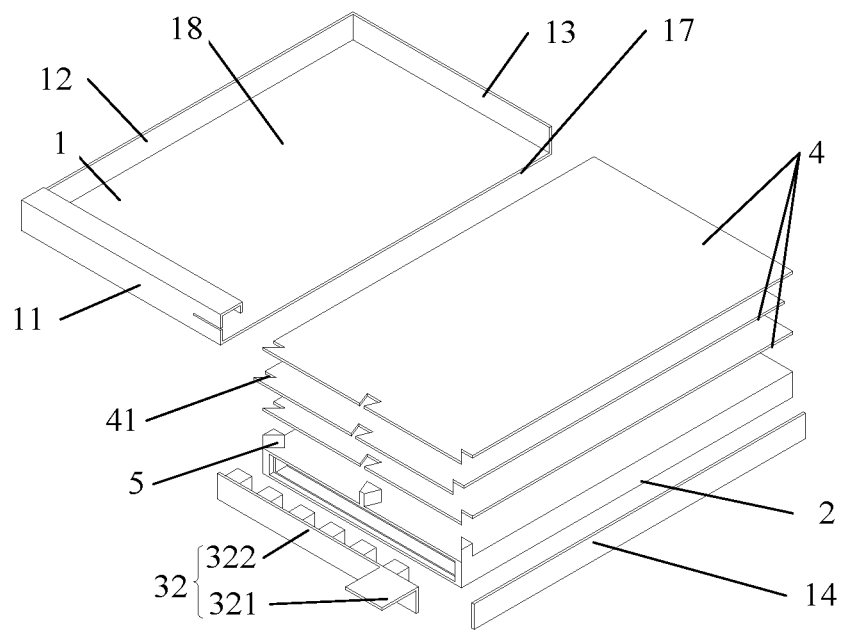
FIG. 1 is an exploded view of the main structure of a backlight provided by an embodiment of the disclosure.

Embodiments of the backlight and the display device proposed by the disclosure will be described in detail below with reference to the drawings, to further elaborate the technical solutions herein and related technical effects. It can be understood that, the exemplary embodiments described in detail below is intended to explain the principle of the technical solutions herein, rather than representing all possible embodiments applying this principle. Other embodiments can be obtained by a person having an ordinary skill in the art based on the disclosure and common technical knowledge in the art, which also pertain to the scope of the application. Additionally, the figures mentioned in the description are only for illustrative purpose, rather than meaning an actual product.

In the following description, the reference signs below will be referred to:

1—back plate, 11—first side wall, 111—escape opening, 12—second side wall, 13—third side wall, 14—fourth side wall, 15—bending side wall, 16—positioning side wall, 17—bottom plate, 18—accommodation groove, 2—light guide plate, 21—first side surface, 22—holding groove, 221—first groove, 222—second groove, 23—second side surface, 24—light exit surface, 25—first edge, 3—light source, 31—light emitting element, 32—circuit board, 321—extension portion, 322—body, 4—optical film, 41—mating notch, 5—positioning pillars, 51—primary positioning pillar, 52—secondary positioning pillar, 6—reflection sheet.

A backlight of a liquid crystal display device may comprise a light source, a light guide plate and various optical films for processing light emitted from the light guide plate. The light source may comprise various types of light emitting elements such as LED light bars, the LED light bars are typically separated from the light guide plate and configured to emit light towards a light entrance surface (e.g., an side surface) of the light guide plate. Inventors of the application realize that the backlight of such structure suffers from the following defects: adhesive materials are usually required to fix the LED bars; some of the light emitted from the light source may directly impinge on the optical film, a light shielding adhesive material attached to the optical film is usually necessary to avoid light directly impinging on the optical films entering the display panel, thus shielding the light which may directly impinge on the optical film, however, there is a high requirement for coating precision of the light shielding adhesive material, light from the light source would still enter the display panel through the optical films even if a small error occurs to the coating of the light shielding adhesive material, which in turn results in an uneven brightness of the displayed image and degrades the viewing effect for the user; further, the adhesive material for fixing the light source and light shielding adhesive material coated on the optical films will age as the usage of the display device and hence is prone to deformation and being wrinkled, which is detrimental to the overall light efficiency of the backlight and quality of the image displayed by the display device.

FIG. 1 illustrates an exploded view of a backlight provided by an embodiment of the disclosure. As shown in FIG. 1, the backlight may include a back plate 1, a light guide plate 2, a light source and an optical film 4. Side walls and a bottom plate of the back plate 1 form an accommodation groove 18, where the light guide plate 2 and the light source can be arranged. The light guide plate 2 includes a holding groove 22 which may be formed at a side surface (which is referred to as "a first side surface" herein) thereof. The light guide plate and the light source are both arranged in the accommodation groove, while at least a portion of the light source can be arranged in the holding groove 22. For example, in some embodiments, the light source includes a circuit board and at least one light emitting element mounted on the circuit board. Some light emitting elements or all light emitting elements may be placed within the holding groove 22, whereas the circuit board is arranged outside of the holding groove 22. Alternatively, it is possible to arrange all the light emitting elements and the circuit board in the holding groove 22. Disposing the light source 3 in the holding groove 22 of the light guide plate makes it possible to reduce or even avoid light from the light source directly impinging onto the optical film 4, since the material of the light guide plate 2 may cover at least a portion of the light emitting surface of the light source. In particular, in case all the light emitting elements and the circuit board are arranged in the holding groove, the material of the light guide plate 2 may cover the whole light emitting surface of the light source, hence, light emitted from the light source would pass through the light guide plate before arriving at the optical films, thereby reducing or avoiding light from the light source directly impinging onto the optical film, which would otherwise cause an uneven brightness of the image displayed by the liquid crystal display device. Instead of disposing the whole light source within the holding groove, but arranging some light emitting elements of the light source in the holding groove, it is enabled to reduce the amount of light that is emitted from the light source and directly impinges onto the optical film, so that the quality of the image displayed by the liquid crystal display device can be improved to some extent. Moreover, if the light source is arranged in the holding groove of the light guide plate, the light source and the light guide plate are actually combined to form a whole, and the light source itself would not additionally occupy the area of the bottom plate of the back plate when the light source and the light guide plate are mounted to the back plate, which is beneficial to narrowing the frame of the liquid crystal display device.

Further, for the embodiment discussed above, as the light source 3 is arranged in the holding groove 22 of the light guide plate 2, light emitted from the light source 3 may directly enter the light guide plate 2, light loss is reduced and utilization efficiency of light is enhanced. Therefore, it is possible to omit the light shielding adhesive material coated on the optical film. Additionally, the light source in the holding groove 22 of the light guide plate 2 can be well protected by the holding groove 22, breakage or the like of the light source 3 caused by an external force can be prevented. The specific ways of fixing the light source 3 in the holding groove 22 are not limited herein, e.g., the light source 3 may be fixed by locking the light source 3 to the holding groove 22, or the light source 3 may be fixed in the holding groove 22 by means of an adhesive tape.

Next, the back plate and the light guide plate of the backlight provided by embodiments of the disclosure will be described in detail by way of example.

Figure 2:
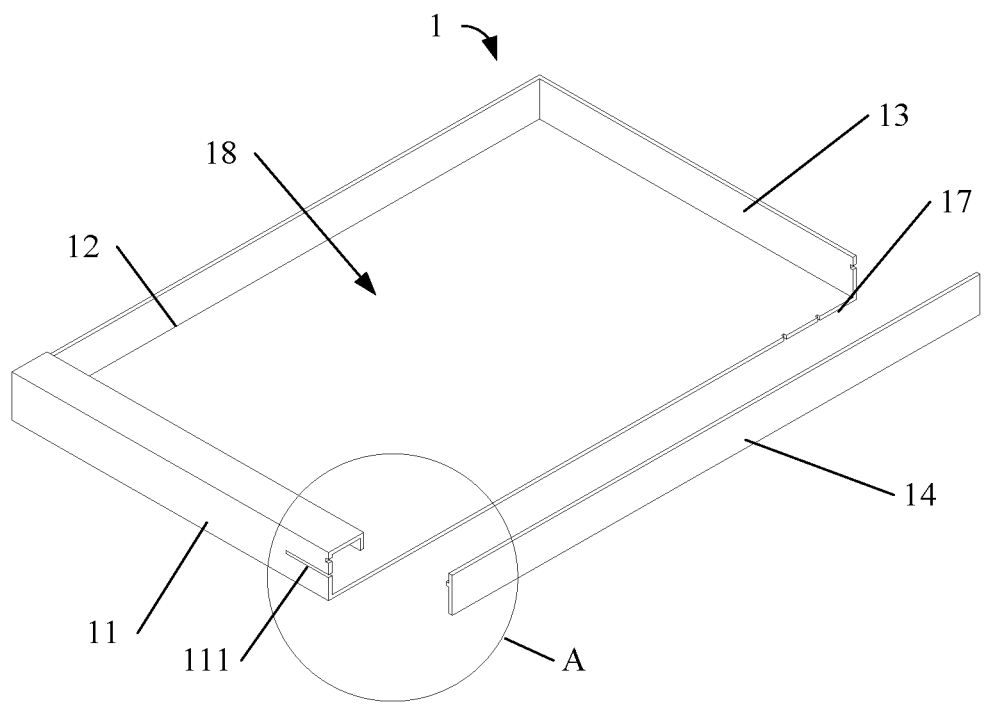
FIG. 2 illustrates a back plate in the backlight provided by an embodiment of the disclosure.

According to some embodiments of the disclosure, the back plate 1 includes a bottom plate 17 and a plurality of side walls, the side walls surround the bottom plate 17 to form an accommodation groove 18 with the bottom plate 17, as shown in FIG. 1 or FIG. 2. In some embodiments, at least one side wall is detachably connected to adjacent side walls and the bottom plate. For example, the side wall 14 shown in FIG. 1 and FIG. 2 is detachably connected to the side walls 11, 13 and the bottom plate 17. When the detachable side wall 14 is detached and separated from the back plate, the bottom plate 17 of the back plate and other side walls 11, 13 form a mounting opening for mounting the light guide plate. At that time, the light guide plate 2 and the light source 3 assembled together may be mounted in the accommodation groove 18 via the mounting opening.

Figure 3:
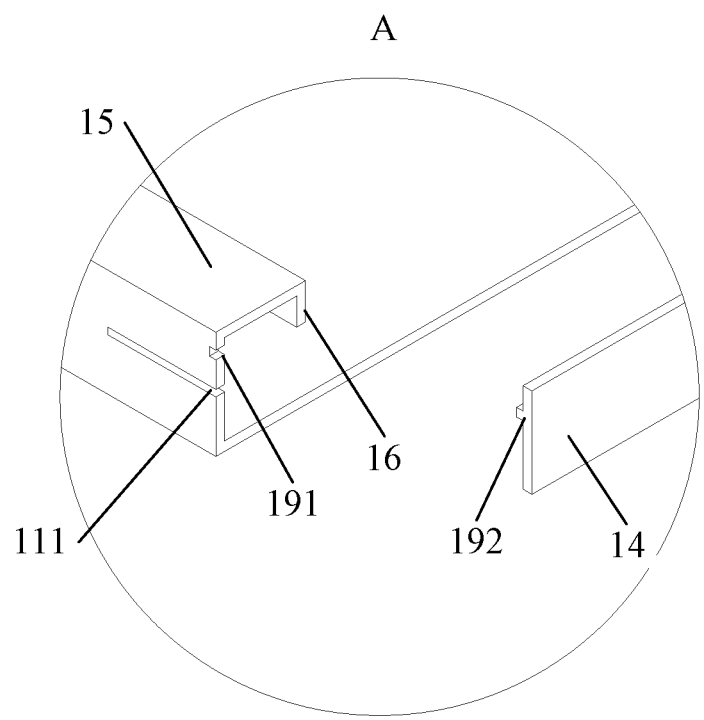
FIG. 3 is an enlarged view of a portion "A" indicated in the back plate shown in FIG. 2.

According to some embodiments of the disclosure, as shown in FIG. 2, the detachable side wall 14 includes a locking protrusion 192, the bottom plate 17 and/or other side walls fixed to the bottom plate include an locking notch 191. The locking protrusion 192 and the locking notch 191 cooperate with each other and are clamped together, thus the detachable side wall 14 can be assembled together with the other side walls or the bottom plate of the back plate (e.g., after the light guide plate 2 and the light source 3 are arranged in the accommodation groove 18 via the mounting opening). FIG. 3 illustrates an enlarged view of the portion "A" indicated in FIG. 2. In this example, the side walls 11, 13 comprise a locking notch 191 respectively, the locking protrusion 192 of the detachable side wall 14 is able to be inserted into the locking notch 191, thereby having the detachable side wall 14 fixed to the side walls 11, 13 and combined with the bottom plate 17, and forming the accommodation groove for accommodating the light guide plate.

According to some embodiments of the disclosure, the display device includes a mounting groove for arranging the backlight. For example, the mounting groove may be in a housing of the display device. An outer surface of at least some of the side walls of the back plate 1 may be coated with an adhesive material, so that the back plate 1 can be fixed to the mounting groove. The outer surface of the side wall of the back plate 1 refers to a surface of the side wall facing away the accommodation groove 18.

Figure 4:
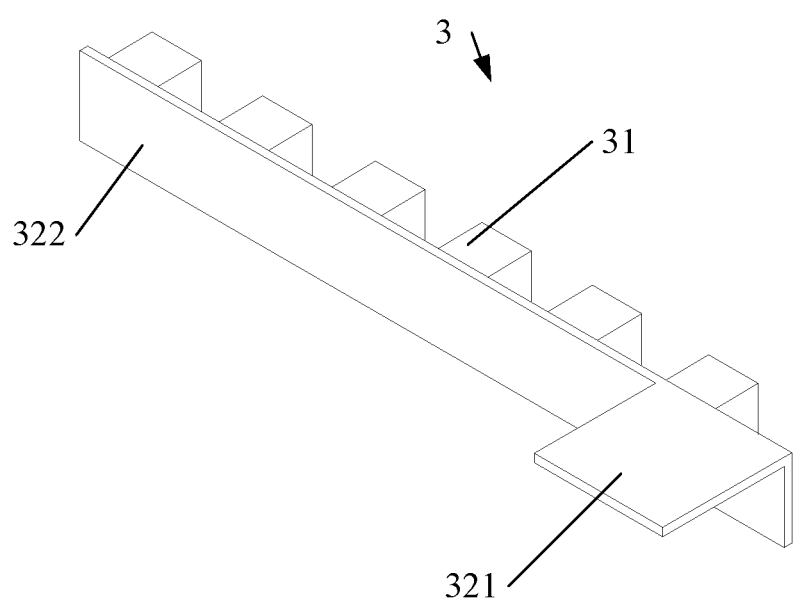
FIG. 4 illustrates a light source in a backlight provided by an embodiment of the present disclosure.

According to some embodiments of the disclosure, the size of the accommodation groove 18 matches the size of the light guide plate 2 equipped with the light source 3, and the accommodation groove is configured such that respective side walls of the back plate 1 are capable of fitting with respective side surfaces of the light guide plate 2, thus, the light guide plate 2 and the light source 3 can be limited by means of the side walls of the back plate 1, which is beneficial to the mounting strength of the backlight and reducing the width of the frame of the display device. FIG. 4 illustrates an example of light source in the backlight according to an embodiment of the disclosure. As shown in FIG. 4, the light source 3 includes a circuit board and at least one light emitting element 31 on the circuit board. In this example, the circuit board is in a shape of a strip as whole, the light emitting element 31 is arranged along a length direction of the circuit board, forming a light source 3 having a shape of a strip on the whole. The light emitting element 31 may include an LED. The general profile of the light source 3 in FIG. 4 may match the holding groove 22 in the light guide plate, the light emitting elements of the light source 3 can be completely held in the holding groove 22. To assemble the backlight provided by the embodiment of the disclosure, the light source 3 may be fixed in the holding groove 22 firstly, then mounting the assembled light source 3 and the light guide plate 2 in the accommodation groove 18, such that groove walls (i.e., the side walls of the back plate) of the accommodation groove 18 can limit the light source 3 and the light guide plate 2. In some embodiments, the light source 3 may cooperate and lock with the holding groove 22, thus it is not required to fix the light source with adhesive material, which is also helpful to the assembling and replacement of the light source 3.

For some conventional liquid crystal display device, the light source 3 is configured to emit light towards a light entrance surface of the light guide plate, but the light source 3 is separated from the light guide plate, the backlight is generally required to have an additional supporting structure to support the light source, and an adhesive material (such as a frame-shaped adhesive) is usually employed to fix the light source 3 to the supporting structure. The adhesive material is prone to warping, so the positioning of the light source 3 would be affected, which is adverse to the overall light utilization efficiency of the backlight and quality of the image displayed by the display device. Moreover, the process of fixing the backlight with a frame-shaped adhesive is rather complex and low in reliability, which is disadvantageous to repairing the backlight. Additionally, due to the factors such as sticking precision, matching degree of expansion rate of the frame-shaped adhesive, various poor performances are easy to occur during the assembly and reliability testing of the display device.

In this embodiment, the light source 3 is detachably connected to the light guide plate 2, and so are the light guide plate 2 and the back plate 1. Because the way of connection is simple, it is convenient to replace the faulted component in the backlight. Further, it is avoided to use a frame-shaped adhesive in the backlight, thus imperfection in assembling of the backlight resulted from the frame-shaped adhesive can be prevented, a high yield of the backlight can be achieved.

As shown in FIGS. 1 to 4, according to some embodiments of the disclosure, the circuit board 32 of the light source 3 includes a body 322 and an extension portion 321 extending from the body 322, the back plate 1 includes an escape opening 111, the extension portion 321 may extend out through the escape opening 111 when the assembled light source and light guide plate are mounted in the accommodation groove 18 of the back plate 1. In an example, the extension portion 321 includes a signal receiving terminal of the circuit board 32, the light source 3 receives a control signal from a control circuit outside the backlight via the signal receiving terminal, in order to control the light emitting elements in the light source 3. For example, the extension portion 321 of the backlight may be bound with a flexible circuit board of the display device, the flexible circuit board may transmit a brightness control signal to the extension portion 321, which is then sent to the circuit board 32. The flexible circuit board of the display device is electrically connected with a main board of the display device. According to some embodiments of the disclosure, the extension portion 321 has a shape of a strip as a whole, the escape opening 111 may be at the bottom plate 17 or a side wall of the back plate. The possible structure and position of the escape opening 111 are not limited to the embodiments herein, as long as the extension portion 321 of the circuit board of the light source 3 is capable of stretching out from the escape opening 111 when the light guide plate and the light source are assembled in the accommodation groove.

As previously mentioned, in the examples of FIGS. 1 and 4, the circuit board 32 includes a strip body 322 and an extension 321 extending from the body 322, a plurality of light emitting elements 31 may be arranged on the body 322 along a length direction of the body 322. Both the body 322 and the light emitting elements 31 can be held in the holding groove 22. According to an embodiment of the disclosure, the light emitting elements 31 may be fixed on a surface of the body 322 facing the light guide plate, the extension direction of the extension portion 321 may intersect and orthogonal to the extension direction of the body 322. The extension portion 321 is flexible, and can be bent to some extent with respect to a plane of the body 322, in this way, the extension portion 321 can stretch out from the escape opening 111 flexibly.

Figure 5:
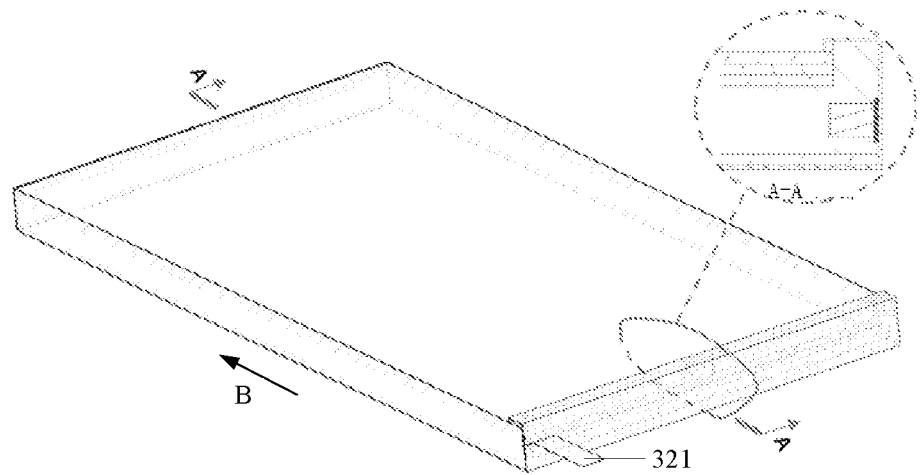
FIG. 5 illustrates an overall structure of a backlight provided by an embodiment of the disclosure, where the light guide plate and the light source are assembled in the back plate of the backlight.

FIG. 5 illustrates that the light source 3 and the light guide plate have been mounted in the accommodation groove of the back plate, the extension portion 321 of the circuit board stretches out from an escape opening in a side surface of the back plate and is exposed to an outer surface (a side surface) of the back plate.

In the embodiment of the disclosure, for an assembled backlight, a side wall of the back plate directly opposite to the first side surface of the light guide plate comprising the accommodation groove is referred to as a first side wall. For example, in the examples of FIGS. 1 and 2, the back plate may include a first side wall 11, a second side wall 12, a third side wall 13 and a fourth side wall 14. According to some embodiments of the disclosure, the first side wall 11 may be a detachable side wall of the side walls, i.e., the first side wall 11 is respectively detachably connected to the second side wall 12, the fourth side wall 14 and the bottom plate 17.

The first side wall may include an escape opening 111, when the first side wall is detached and separated from other components, the above mentioned mounting opening is formed. Once the light guide plate 2 and the light source 3 are assembled and arranged in the accommodation groove 18, the extension portion 321 of the circuit board of the light source 3 is exposed at the mounting opening, then the first side wall 11 is combined with the bottom plate and other side walls of the back plate. The escape opening 111 in the first side wall 11 is corresponding to the position of the extension portion 321, the extension portion 321 passes through the escape opening 111 when the first side wall 11 is mounted. Alternatively, the first side wall 11 may be opposite to the detachable side wall, i.e., the third side wall 13 is detachable, in this case, the first side wall 11, the second side wall 12 and the fourth side wall 14 are fixed to the bottom plate 17, while the third side wall 13 is detachably connected with the bottom plate 17, the second side wall 12 and the fourth side wall 14. The first side wall 11, the second side wall 12, the fourth side wall 14 and the bottom plate 17 together form the mounting opening for mounting the light guide plate and the light source. The process of assembling the backlight may involve the following steps: combining the light guide plate 2 and the light source 3 such that the extension portion 321 of the circuit board of the light source and the first side surface 21 of the light guide plate 2 are directly opposite to the first side wall 11; pushing the light guide plate 2 and the light source 3 into the accommodation groove 18 along the mounting opening so that the extension portion 321 gradually passes through the escape opening 111 in the first side wall 11; then fixing the side wall 13 to the back plate. In this way, the main components of the backlight are assembled.

In another embodiment, the detachable side wall is adjacent to the first side wall 11, in this case, the second side wall 12 or the fourth side wall 14 are detachable. Taking the fourth side wall 14 being detachable as an example, in this case, the first side wall 11, the second side wall 12 and the third side wall 13 form a mounting opening, the escape opening 111 in the first side wall communicates with the mounting opening, that is, the escape opening 111 extends to an edge of the first side wall 11 adjacent to the fourth side wall 14. Assembling the backlight may involve the following steps: pushing the light guide plate 2 and the light source combined together into the accommodation groove 18 along the mounting opening, meanwhile, the extension portion 321 gradually enters into the escape opening 111 towards the direction of the escape opening 111 and is exposed outside the escape opening 111.

In the above embodiments, the extension portion 321 of the circuit board of the light source 3 may stretch out via the escape opening 111 and extends outside the accommodation groove 18, which is helpful for the circuit board 32 to bond to a flexible circuit board outside the accommodation groove 18. In order to avoid the extension portion 321 waggling in the escape opening 111, in some embodiments, a distance between the first side wall 11 and the third side wall 13 facing the first side wall 11 is equal to or slightly greater than a length of the light guide plate along a first direction, the first direction is indicated with an arrow "B" in FIG. 5, which is from the first side surface of the light guide plate to the a side surface of the light guide plate opposite to the first side surface. When the light guide plate 2 and the light source 3 are mounted in the accommodation groove 18, the first side wall 11 engages with the first side surface 21, the third side wall 13 engages with a second side surface of the light guide plate directly opposite to the first side surface, the second side wall 12 and the fourth side wall 14 respectively engage with the other two side surfaces of the light guide plate. In this case, when the circuit board 32 and the light emitting elements 31 are arranged in the accommodation groove, the first side wall 11 is able to engage with a surface of the body of the circuit board 32 facing away from the light emitting element 31, thereby the circuit board 32 can be limited, and the light source 3 and the holding groove 22 can be fixed without additional technical measures.

In other embodiments, the escape opening 111 may be located at the bottom of the accommodation groove 18, i.e., the bottom plate 17 of the back plate includes the escape opening, the escape opening may e.g. be disposed at an edge of the bottom plate 17 close to the detachable side wall, which can be changed as need and is not limited to the embodiments herein.

Figure 6:
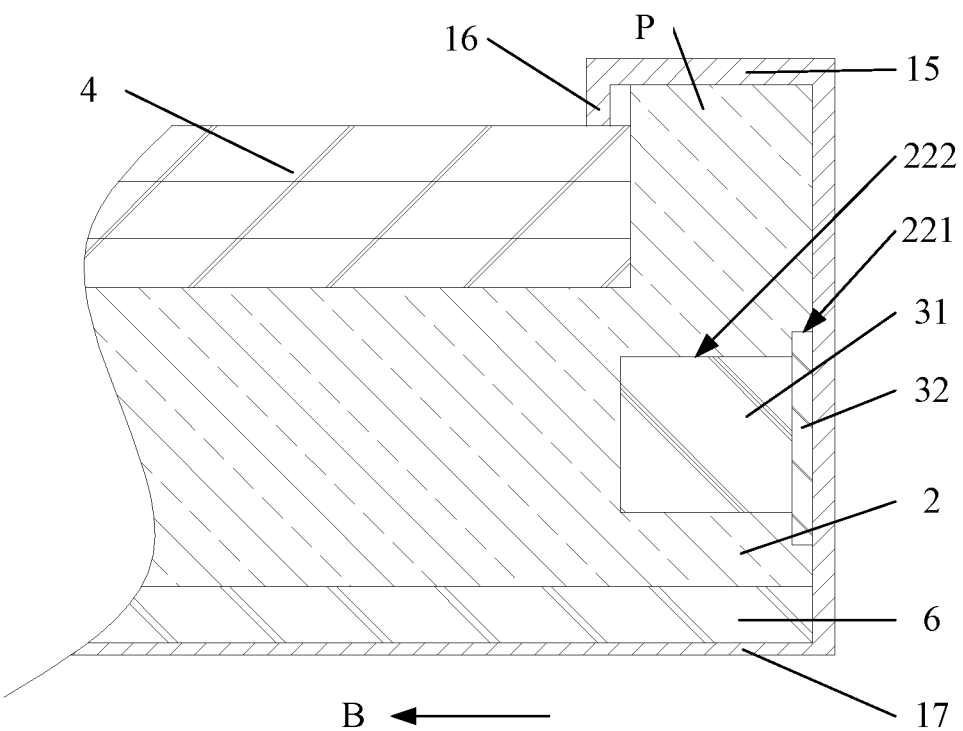
FIG. 6 illustrates a partial sectional view of the backlight shown in FIG. 5 taken along a line A-A indicated in FIG. 5.
Figure 7:
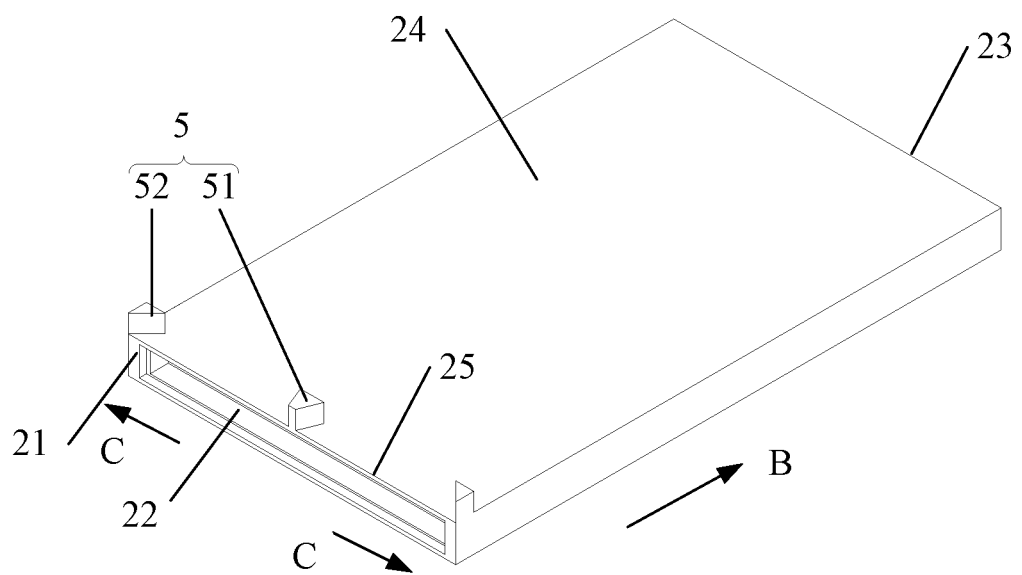
FIG. 7 illustrates a light guide plate in a backlight provided by an embodiment of the disclosure.
Figure 8:
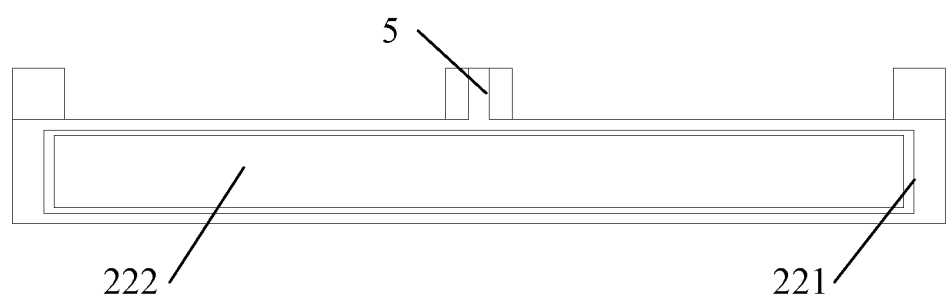
FIG. 8 is a side view of the light guide plate shown in FIG. 7, which is viewed from a first side of the light guide plate.

Next, the holding groove in the light guide plate of the backlight provided by the embodiments herein will be further discussed by way of example. FIG. 5 illustrates an entire structural view of the backlight, where the light guide plate and the light source have been mounted in the accommodation groove of the back plate. FIG. 6 shows a partial sectional view of the backlight taken along the line A-A in FIG. 5. FIG. 7 illustrates a perspective view of the light guide plate of the backlight, while FIG. 8 is a side view of the light guide plate shown in FIG. 7, seen from the first side surface 21. Referring to FIGS. 6 to 8, the holding groove 22 is at the first side surface 21 of the light guide plate, and the holding groove 22 includes a first groove 221 and a second groove 222 communicating with each other, the first groove 221 includes a first opening and a first bottom, the second groove 222 includes a second opening and a second bottom. The first opening of the first groove 221 penetrates at least a portion of the first side surface 21 of the light guide plate, the first bottom of the first groove 221 is opposite to the first opening. The second opening of the second groove 222 is formed at the first bottom of the first groove 221, i.e., the second groove 222 penetrates a portion of the first bottom of the first groove. Therefore, in the partial sectional view of FIG. 6, the first groove 221 is closer to the first side surface 21 of the light guide plate than the second groove 222. According to some embodiments of the disclosure, the first groove 221 is configured to accommodate at least a part of the circuit board of the light source, the second groove 222 is configured to accommodate at least some light emitting elements of the light source. Alternatively, in another embodiment, all light emitting elements of the light source are placed in the second groove 222, and the body of the circuit board of the light source is accommodated in the first groove 221. The light emitting elements are typically fixed on a surface (the surface is called a first surface herein) of the body of the circuit board. An area of the first surface of the body of the circuit board is generally greater than an area of the first surface occupied by the light emitting element. Accordingly, the area of the first opening of the first groove 221 is greater than the area of the second opening of the second groove 222. In other words, an orthographic projection of the second groove 222 on the first side 21 is within an orthographic projection of the first groove 221 on the first side 21. In case of the circuit board 32 including the extension portion 321, instead of being arranged in the holding groove 22, the extension portion may extend from the body of the circuit board to the exterior of the holding groove, so as to be bound to the flexible circuit board of the display device. According to some embodiments of the disclosure, the area of the first surface of the body of the circuit board of the light source is substantially equal to the area of the first opening of the first groove 221, hence, when the light source including the circuit board and the light emitting elements are placed in the holding groove 22, the body of the circuit board 32 fills the first opening of the first groove 221, it is enabled that light emitted from the light emitting element 31 would not leak from the opening (i.e., the first opening of the first groove) of the holding groove 22, in this way, it is possible to avoid the light from the light emitting elements directly impinging onto the optical films above the light guide plate as much as possible, instead, most of the light from the light emitting elements would be processed by the light guide plate before reaching the optical films, and the utilization efficiency of light is greatly enhanced. The term "substantially equal to" mentioned herein means the area of the first surface may be exactly equal to the area of the first opening of the first groove 221, it may also mean the area of the first surface may be slightly greater or smaller than the area of the first opening of the first groove 221, as long as the difference between the two areas allows the body of the circuit board to be mounted in the first groove 221 so that light from the light emitting elements does not significantly leak from the first opening. For example, the difference between the area of the first surface of the body 322 of the circuit board and the area of the first opening of the first groove 221 may be not greater than 10% or 5% of the value of any of the two areas.

In some embodiments, the second groove 222 has a shape that is substantially consistent with the shape of the entire arrangement of the plurality of light emitting elements 31 fixed on the body of the circuit board, so as to accommodate all the light emitting elements. Alternatively, in other embodiments, the second groove 222 may comprise multiple sub-grooves separated from each other, the sub-grooves are arranged in a way similar to the way the plurality of light emitting elements are arranged on the body of the circuit board, each of the sub-grooves is configured to hold at least one light emitting element 31. According to some embodiments of the disclosure, the number of the sub-grooves of the second groove is the same as the number of the light emitting elements (e.g., LED) 31 on the body of the circuit board, that is to say, each sub-groove accommodates one light emitting element, thus a preciser engagement of the light source 3 with the holding groove 22 can be achieved.

According to some embodiments of the disclosure, the light guide plate includes at least one positioning pillar on the light exit surface thereof. As shown in FIG. 1, 7 or 8, at least one positioning pillar 5 is arranged on the light exit surface 24 of the light guide plate, the light exit surface refers to a surface of the light guide plate that faces away from the bottom plate 17 of the back plate when the light guide plate is assembled with the back plate 1. When the display device is operating, light emitted from the light source exits from the light exit surface 24 after processed by the light guide plate. As shown in FIG. 1, the optical films 4 may include at least one optical sheet such as a diffusion sheet, a lower prismatic lens and an upper prismatic lens, the optical sheets are stacked on the light exit surface 24. At least one positioning pillar 5 is arranged at an edge of the light exit surface 24, at least one mating notch 41 is formed at an edge of the optical films 4, the positioning pillar 5 is capable of engaging in the mating notch 41. Therefore, the optical films 4 can be limited and fixed without other adhesive materials, the cost for manufacturing the backlight is lowered and the yield of the backlight is enhanced. According to some embodiments of the disclosure, the light guide plate 2 and the positioning pillars 5 may be formed by one injection molding process, so that the positioning pillars 5 are integrated with the light guide plate 2, and are capable of engaging with the mating notch 41 in the optical films 4 precisely.

As shown in FIG. 7, in some embodiments, an edge of the light exit surface of the light guide plate that connects the first side surface is referred to as a first edge 25, the at least one positioning pillar 5 is arranged at the first edge 25. When the backlight and the display panel are assembled to form a liquid crystal display device, the region of the display panel corresponding to the light source 3 is a non-displaying region, hence, the first edge 25 is corresponding to the non-displaying region, and a region of the light exit surface 24 near the first edge 25 also acts as a non-displaying region, the non-displaying region may span a preset distance from the first edge 25. The value of the preset distance is related to the size of the light source held in the holding groove of the light guide plate, for example, it may be substantially the same as the extension length of the holding groove in the direction "B" shown in FIG. 7. The positioning pillars 5 are arranged along the first edge 25, such that the area of the positioning pillars 5 corresponds to an non-displaying region, rather than occupying the displaying area of the display device. A width of the non-displaying region typically corresponds to a width of the frame of the display device. Therefore, by arranging the positioning pillars 5 along the first edge of the light exit surface, the width of the frame of the display device can be reduced, further facilitating the narrowing of the frame of the display device.

As shown in FIG. 7, in some embodiments, the positioning 5 is in a shape of a prism, the mating notch 41 of the optical film 4 has a shape fitting with the positioning pillar 5. Side surfaces of the prism act as multiple engaging surfaces having different orientations. In this way, by stacking the optical films 4 on the light guide plate, and combining the optical films 4 with the positioning pillars 5 on the light guide plate via the mating notch, the optical films 4 can be limited by the position pillars 5 in multiple directions, even the optical films 4 may be effectively fixed and limited by means of only one positioning pillar 5. In other embodiments, the light guide plate may include a plurality of positioning pillars 5 which are arranged along the first edge 25, thus the positioning reliability of the optical films 4 can be further improved.

Continuing to refer to FIG. 7, a plurality of positioning pillars 5 are arranged along the first edge 25, there may be a mating gap between each positioning pillar and a corresponding mating notch when the optical films 4 is combined with the light guide plate by the mating notch and the positioning pillars. In some embodiments, the plurality of positioning pillars 5 include a central pillar in the middle of the first edge 25, which is referred to as a primary positioning pillar 51, and the positioning pillars 5 on either side of the primary positioning pillar 51 may be called secondary positioning pillars 52. The mating gap between the secondary positioning pillar 52 and a corresponding mating notch may be greater than that between the primary positioning pillar 51 and a corresponding mating notch. The mating gap may provide expansion space for the optical films 4 when the optical films 4 expand. The primary positioning pillar 51 is located at a center of the first edge, if the optical films 4 expand, the expansion direction is from the central position of the first edge to either sides of the central position, e.g., as indicated with the arrow "C" in FIG. 7. Moreover, the optical films 4 may expand increasingly along the above expansion direction, hence, it is possible to prevent the secondary positioning pillar 52 from restricting the expansion of the optical films 4 by having the mating gap between the secondary positioning pillar 52 and a corresponding mating notch greater than that between the primary positioning pillar 51 and a corresponding mating notch, which otherwise would result in wrinkle of the optical films 4. Meanwhile, the secondary positioning pillars 52 are helpful in positioning the optical films 4, thus precision in positioning of the optical films 4 can be improved. In some embodiments, the positioning pillar 5 has a height greater than a thickness of the optical films 4, which is advantageous to limiting the optical films 4 by means of the positioning pillars.

As shown in FIGS. 1 and 7, the primary positioning pillar 51 is a quadrangular prism, the mating notch of the optical films for engaging with the primary positioning pillar 51 is half-open, the mating notch includes an opening at a side of the mating notch close to the first side surface of the light guide plate, the primary positioning pillar 51 has a width gradually increasing along the first direction (as indicated with the arrow "B" in FIG. 7). In this way, the primary positioning pillar 51 is capable of limiting the movement of the optical films in the first direction. Besides, the mating notch of the optical films for engaging with the primary positioning pillar 51 including an opening may facilitate the fabrication of the optical films. According to some embodiments of the disclosure, as shown in FIG. 1 or 7, the secondary pillar 52 may be a triangular prism and have a width gradually increasing in a direction (e.g., as indicated with the arrow "C" in FIG. 7) from the center of the first edge to the second positioning pillar, thereby effectively preventing the optical films from moving in the direction (as indicated with the arrow "C" in FIG. 7), thus the stability of the optical films is further enhanced. In other embodiments, the secondary positioning pillars may comprise quadrangular prims, and the mating notch is a half-open opening for engaging with the secondary positioning pillar 52. The shapes of the primary and secondary positioning pillars are not limited to the embodiments herein.

Continuing to refer to FIGS. 1, 2, 3, 5 and 6, according to some embodiments of the disclosure, the back plate 1 may further include a bending side wall 15 and a positioning side wall 16. The bending side wall 15 extends towards the accommodation groove 18 from the first side wall 11, the positioning side wall 16 extends towards the bottom plate 17 of the back plate from an end of the bending side wall 15 away from the first side wall. The backlight further includes a reflection sheep 6 between the light guide plate and the bottom plate, thus the first side wall 11, the bending side wall 15, the positioning side wall 16 and the reflection sheet 6 may form a small space P as shown in FIG. 6. The material of the light guide plate at least partly fills the space P, therefore, in addition to the first side wall, the material of the light guide plate in the space P may support the bending side wall 15. As shown in FIG. 6, the optical films 4 may be arranged between the light exit surface and the positioning side wall 16 of the light guide plate, thus the positioning side wall 16 may effectively restrict the movement of the optical films 4 and the light guide plate 2 in a vertical direction, the vertical direction refers to a thickness direction of the light guide plate 2.

According to some embodiments of the disclosure, the bending side wall 15 is located in the non-displaying region of the display device, an orthographic projection of the positioning pillars 5 of the light guide plate on the bottom plate 17 is within an orthographic projection of the bending side wall 15 on the bottom plate 17. In case of the height of the positioning pillar 5 being equal to the thickness of the optical films 4, the positioning side wall 16 is not necessary, the distance between the bending side wall 15 and the bottom plate 17 may be made equal to a sum of the heights of the light guide plate 2 and the positioning pillar 5, so that the bending side wall 15 is pressed against the optical films 4, in turn the optical films 4 and the light guide plate 2 can be restricted in the vertical direction just by means of the bending side wall 15. In case of the positioning pillar 5 having a height greater than the thickness of the optical films 4, the positioning pillars 5 may contact a surface of the bending side wall 15 facing the bottom plate 17, the bending side wall 15 is capable of limiting the light guide plate 2, but unable to effectively limit the optical films 4, while the positioning side wall 16 as described above may achieve further limitation to the optical films 4 and the light guide plate 2.

Assembling the backlight provide by the embodiments of the disclosure may involve the following steps: engaging the light source 3 with the light guide plate 2, i.e., placing the light source 3 within the holding groove of the light guide plate 2, then mounting the optical films such as the diffusion sheet, the lower prismatic lens, the upper prismatic lens onto the light exit surface of the light guide plate 2; combing the back plate 1 and the reflection sheet 6 together, the detachable side wall is not attached to the back plate at that time to form the mounting opening; mounting the combined light guide plate 2 and the optical films 4 into the accommodation groove 18 of the back plate 1 via the mounting opening, subsequently, fixing the detachable side wall of the back plate 1 to the mounting opening, i.e., combing the detachable side wall together with the bottom plate of the back plate and other side walls.

A further embodiment of the disclosure provides a display device comprising the backlight provided by any of the above embodiments. The beneficial effects of the backlight provided by any of the above embodiments also hold for the display device and would not be repeated herein.

What has been described above is some exemplary embodiments of the disclosure, the protection scope of the application will not be so limited. Variants and modifications that can be easily conceived by a person of ordinary skilled in the art within the technical scope revealed in the disclosure pertain to the scope of the application. The protection of the application should be subjected to the scope of the appended claims.

The invention claimed is:

1. A backlight comprising:
a back plate comprising an accommodation groove;
a light guide plate comprising a first side surface and a holding groove at the first side surface; and
a light source comprising at least one light emitting element,
wherein the holding groove is configured to hold at least a portion of the at least one light emitting element, and the accommodation groove is configured to accommodate the light guide plate and the light source,
wherein the holding groove comprises a first groove and a second groove, the first groove comprises a first opening and a first bottom, the second groove comprises a second opening and a second bottom, and
wherein the first opening penetrates at least a portion of the first side surface of the light guide plate, the second opening penetrates at least a portion of the first bottom, such that the first groove communicates with the second groove.

2. The backlight according to claim 1, wherein the back plate comprises a bottom plate and a plurality of side walls, and the plurality of side walls surround the bottom plate to form the accommodation groove with the bottom plate.

3. The backlight according to claim 2, wherein the light source comprises a circuit board comprising a body, the at least one light emitting element is arranged on a surface of the body facing the holding groove.

4. The backlight according to claim 3, wherein the circuit board further comprises an extension portion connected to the body, wherein the back plate further comprises an escape opening, the escape opening is configured to allow the extension portion to extend from the accommodation groove to outside of the accommodation groove through the escape opening.

5. The backlight according to claim 4, an extension direction of the extension portion is perpendicular to an extension direction of the body.

6. The backlight according to claim 4, wherein the plurality of side walls of the back plate comprise a first side wall, the first side wall is directly opposite to the first side surface of the light guide plate and comprises the escape opening.

7. The backlight according to claim 5, wherein the plurality of side walls comprise a detachable side wall, the detachable side wall is configured to be detachably connected to an adjacent side wall thereof and the bottom plate, so that a mounting opening is formed for allowing the light guide plate and the light source to enter or come out of the accommodation groove when the detachable side wall is detached, wherein the escape opening in a first side wall of the plurality of side walls extends to the mounting opening.

8. The backlight according to claim 1, wherein an orthographic projection of the second opening on the first side surface is within an orthographic projection of the first opening on the first side surface.

9. The backlight according to claim 1,
wherein the light source comprises a circuit board comprising a body,
wherein the at least one light emitting element is arranged in the second groove, the body of the circuit board is arranged in the first groove.

10. The backlight according to claim 9, wherein the second groove comprises a strip groove configured to accommodate all of the at least one light emitting element.

11. The backlight according to claim 9, wherein the second groove comprises a plurality of sub-grooves arranged along the first bottom, a number of the plurality of sub-grooves corresponds to a number of the light emitting element of the at least one light emitting element, each of the plurality of sub-grooves is configured to accommodate one of the at least one light emitting element.

12. The backlight according to claim 2, wherein the light guide plate is located on the bottom plate, the backlight further comprises an optical film arranged on a light exit surface of the light guide plate, the light guide plate further comprises at least one positioning pillar on the light exit surface, the optical film comprises at least one mating notch, each of the at least one positioning pillar is configured to be capable of being assembled in a corresponding mating notch of the at least one mating notch so that the optical film is fixed to the light exit surface.

13. The backlight according to claim 12, wherein the at least one positioning pillar comprises a prism, a shape of the at least one mating notch fits with the prism.

14. The backlight according to claim 12, wherein the back plate further comprises a bending side wall and a positioning side wall, the bending side wall extends from a first side wall of the plurality of side walls of the back plate towards the accommodation groove, the positioning side wall extends towards the bottom plate from an end of the bending side wall away from the first side wall.

15. The backlight according to claim 14, wherein the backlight further comprises a reflection sheet between the light guide plate and the bottom plate, a material of the light guide plate fills a space enclosed by the reflection sheet, the first side wall, the bending side wall and the position side wall, wherein the optical film is between the positioning side wall and the light exit surface of the light guide plate.

16. A display device comprising the backlight according to claim 1.

17. A backlight comprising:
a back plate comprising an accommodation groove;
a light guide plate comprising a first side surface and a holding groove at the first side surface; and
a light source comprising at least one light emitting element,
wherein the holding groove is configured to hold at least a portion of the at least one light emitting element, and the accommodation groove is configured to accommodate the light guide plate and the light source,
wherein the back plate comprises a bottom plate and a plurality of side walls, and the plurality of side walls surround the bottom plate to form the accommodation groove with the bottom plate,
wherein the light guide plate is located on the bottom plate, the backlight further comprises an optical film arranged on a light exit surface of the light guide plate, the light guide plate further comprises at least one positioning pillar on the light exit surface, the optical film comprises at least one mating notch, each of the at least one positioning pillar is configured to be capable of being assembled in a corresponding mating notch of the at least one mating notch so that the optical film is fixed to the light exit surface, and
wherein the light exit surface of the light guide plate comprises a first edge connected to the first side surface, the at least one positioning pillar is arranged on the light exit surface along the first edge.

18. The backlight according to claim 17, wherein a mating gap exists between each positioning pillar of the at least one positioning pillar and a corresponding mating notch of the optical film,
wherein the at least one positioning pillar comprises a primary positioning pillar in a middle of the first edge and a secondary positioning pillar on at least one side of the primary positioning pillar,
wherein the mating gap between the secondary positioning pillar and a corresponding mating notch is greater than a mating gap between the primary positioning pillar and a corresponding mating notch.

19. A backlight comprising:
a back plate comprising an accommodation groove;
a light guide plate comprising a first side surface and a holding groove at the first side surface; and
a light source comprising at least one light emitting element,
wherein the holding groove is configured to hold at least a portion of the at least one light emitting element, and the accommodation groove is configured to accommodate the light guide plate and the light source,
wherein the back plate comprises a bottom plate and a plurality of side walls, and the plurality of side walls surround the bottom plate to form the accommodation groove with the bottom plate,
wherein the light guide plate is located on the bottom plate, the backlight further comprises an optical film arranged on a light exit surface of the light guide plate, the light guide plate further comprises at least one positioning pillar on the light exit surface, the optical film comprises at least one mating notch, each of the at least one positioning pillar is configured to be capable of being assembled in a corresponding mating notch of the at least one mating notch so that the optical film is fixed to the light exit surface,
wherein the back plate further comprises a bending side wall and a positioning side wall, the bending side wall extends from a first side wall of the plurality of side walls of the back plate towards the accommodation groove, the positioning side wall extends towards the bottom plate from an end of the bending side wall away from the first side wall, and
wherein an orthogonal projection of the at least one positioning pillar on the bottom plate is within an orthogonal projection of the bending side wall on the bottom plate.

* * * * *